United States Patent [19]

Chisholm

[11] Patent Number: 5,014,067
[45] Date of Patent: May 7, 1991

[54] INTEGRATED LANDING SYSTEM

[75] Inventor: John P. Chisholm, Olympic Valley, Calif.

[73] Assignee: Sundstrand Data Control, Inc., Redmond, Wash.

[21] Appl. No.: 493,044

[22] Filed: Mar. 12, 1990

[51] Int. Cl.⁵ .............................................. G01S 1/08
[52] U.S. Cl. ................................................... 342/407
[58] Field of Search ............................... 342/407, 408

[56] References Cited

U.S. PATENT DOCUMENTS

4,178,581  12/1979  Willey, Sr. .
4,429,312  1/1984   Chisholm .
4,635,064  1/1987   Chisholm .
4,647,926  3/1987   Devensky et al. .

Primary Examiner—Theodore M. Blum
Attorney, Agent, or Firm—Michael S. Yatsko

[57] ABSTRACT

An integrated landing system interleaves signals encoded in a first format such as the microwave landing system that (MLS) format with signals encoded in a second format such as the precision tactical approach guidance (PTAG) format to permit approach guidance information to be transmitted to aircraft having either MLS receivers or PTAG receivers.

7 Claims, 7 Drawing Sheets

FIG_1a_
PRIOR ART

FIG_1b_

FIG_1c_

FIG_1d_

INTEGRATED LANDING SYSTEM

BACKGROUND OF THE INVENTION

1. Field of the Invention

Integrated Landing System (ILS) is the landing system currently used worldwide. It operates via the use of paired overlapping fixed beams that define a guidance path. Because of the use of VHF frequencies, i.e., 100 MHz for azimuth guidance and 300 MHz for vertical guidance, the antennas used for ILS are quite large. An azimuth guidance array might be 100 feet wide and a vertical guidance antenna 25 feet high, for example, In addition, the ILS vertical guidance antenna generally requires level smooth terrain for some distance in front of the array since the guidance beam uses the image array (below the smooth surface) to form the guidance beam as is well known in the prior art.

ILS is scheduled to be replaced by MLS (Microwave Landing System), a system whose development was initiated in the 1960's to overcome the then existing deficiencies of ILS. MLS operates at an assigned C-band microwave frequency (5000 MHz). The use of microwave frequencies permits the generation of narrow beams that scan the desired guidance path in both azimuth and elevation. Even though MLS operates at a much higher frequency than ILS, i.e., 5000 MHz rather than 100 MHz and 300 MHz as in ILS, the need to generate narrow scanning beams requires that relatively large, complex and expensive antenna systems be employed. An ILS elevation guidance scanning array assembly, for example, can extend up to 12 feet in height.

In addition to initiating a program in the 1960's to develop MLS as an ILS replacement, the FAA simultaneously embarked on a program to overcome the then existing deficiencies of ILS. As a result of this second program, the operation of ILS has been improved to the point where it now performs very satisfactorily. This has resulted in considerable controversy as to the current merit of replacing ILS by MLS at civil airports.

The MLS program as initiated in the 1960's was primarily a civil effort with the military services during this period independently embarking on various programs to satisfy their landing requirements that could not be satisfied by ILS.

In general, the military's landing system development efforts that occurred during the MLS development period focused on providing simple and very lightweight ground equipment for use in the tactical environment. A basic approach in this connection was to utilize a much higher microwave frequency than that employed by the C-band MLS system in order that the antenna system employed be smaller and, hence, lighter. The type of scanning beam guidance techniques employed by MLS were generally retained, however, the resulting military landing aids that evolved did not result in extremely simple and lightweight ground equipment.

In the late 1970's, a decision was made by the military to generally cease their own landing aid development efforts and to participate in the FAA MLS program. This decision was based on at least two considerations. First was the desire to have a common civil and military landing aid signal format so that military aircraft could use the same airborne receiver at both civil and military airports. Second was the belief that the then on-going MLS program would ultimately yield the desired lightweight ground station. The desired ground station weight for tactical uses was specified in a 1978 A.F. General Operational Requirement (GOR) as being 100 pounds with the equipment capable of being broken down into 35 pound modules for ease in transportation under the tactical environment.

At the present time, as noted above, the MLS program is now facing serious oppositions by civil users, since ILS now generally satisfies their landing requirements and the dubious benefits that MLS offers over ILS is currently not considered to be commensurate with the cost of retrofitting their aircraft with MLS avionics. In addition, the resulting MLS ground station hardware currently under development for military uses is complex and heavy (1000 pounds versus the desired 100 pounds) so that it does not satisfy those unique military tactical requirements that require extremely lightweight ground equipment.

What is required then in addition to the improved ILS system that is currently satisfying conventional civil requirements is a simple landing system that will satisfy unique civil and military landing needs that ILS will not satisfy. One unique civil application that ILS will not satisfy is to provide landing guidance to a rooftop heliport.

A second unique civil landing aid requirement is to provide landing guidance in a narrow valley like Aspen, Colo., where, despite many attempts by the FAA, it has not been possible to certify an ILS installation.

The unique military requirement of particular interest is that which requires an extremely lightweight ground station.

In addressing this problem of satisfying these unique civil and military requirements, it can be first noted that the use of microwave frequencies, instead of the low ILS frequencies, is mandatory for both unique civil and military applications. For example, in at least one unique civil application, such as a rooftop heliport, the low frequencies used in ILS will not provide the required guidance beams because such ILS guidance beams require a smooth ground plane, such as the airport surface, extending some 800 feet in front of the glide slope antenna (as noted previously) for proper beam formation. In the case of unique military applications, the light weight requirements mandates the use of microwaves for achieving small and lightweight antennas.

It can additionally noted that use of the MLS signal format is highly desirable since it is the only one that is currently universally accepted and/or likely to be universally accepted for the foreseeable future. A third consideration is to utilize some other guidance technique than one that requires the complex scanning beam mechanism of MLS.

2. Description of the Prior Art

Two separate landing systems, both operating at microwave frequencies, have evolved to meet these unique civil and military requirements. A first system is outlined in U.S. Pat. No. 4,635,064. That patent describes an MLS fixed beam, in contrast to a scanning beam landing system, which fixed beam landing system is much simpler than the conventional scanning beam MLS. The fixed beam MLS ground station radiates a signal that is compatible with the MLS signal format and, thus, can be received and utilized by an MLS-type receiver. This new and simpler C-band fixed beam MLS landing system has been given the acronym FBMLS (Fixed Beam Microwave Landing System) in contrast to the conventional Scanning Beam Microwave Landing System (SBMLS). FBMLS is suitable for all conventional civil airports, unique civil applications like rooftop heliports and conventional military fixed bases. Its primary advantages are its extreme simplicity due to its use of a fixed beam, in contrast to a scanning beam technology, and its compatibility with the MLS signal format.

This FBMLS system, in order to be fully compatible with MLS, operates in the MLS assigned C-band frequency allocation. For this reason, the FBMLS ground station is still relatively large and complex in terms of the desired military goal of 100 pounds, but still simpler and lighter than the SBMLS ground station, i.e., say 350 pounds versus the above-noted 1000 pounds.

A second landing system design, described in U.S. Pat. No. 4,429,312, focuses on the unique military requirement for a landing system ground station weighing 100 pounds, in 35 pound modules. This light weight characteristic permits the ground station to be readily transported by military personnel, such as paratroopers. Such a landing system with a lightweight ground station has been built and flight tested. It has been given the acronym PTAG (Portable Tactical Approach Guidance). The complete localizer and/or glide slope stations each weigh 35 pounds, for a total ground station weight of 70 pounds, i.e., it meets the 78 A.F. requirement for a 100 pound total weight in 35 pound modules. PTAG employs a higher microwave frequency than the MLS C-band frequency, which higher microwave frequency permits reduced antenna size, and hence, reduced weight. In addition, PTAG also employes simple fixed beam guidance technology similar to that used in FBMLS. The combined use of the higher microwave frequency, and simple fixed beam antenna technology has resulted in achieving the desired lightweight ground station. The system is being sold by Sundstrand (Data Control, Inc.) to the military under the PTAG trademark.

SUMMARY

To summarize, the application of precision guidance fixed beam technology to MLS, instead of scanning beam guidance technology, has resulted in a simple C-band MLS compatible landing ground station (FBMLS) which also, in order to be fully compatible with MLS operates in the MLS assigned C-band frequency allocation.

In addition, the application of both simple fixed beam technology and the use of a higher microwave frequency than C-band, namely X-band (9000 MHz) has resulted in a landing system, PTAG, that satisfies the unique military requirement for a very lightweight ground station (35 pounds).

It can, therefore, be noted that the simple C-band MLS landing system employing fixed beam technology, that has evolved, is ideal for all civil uses, including special civil applications such as rooftop heliports as well as military fixed base use where ground station weight is not critical. It is compatible with the internationally acceptable MLS signal. The ground station is not light enough, however, to satisfy certain unique military requirements.

In addition, a landing system termed PTAG with an extremely simple and very lightweight ground station (35 pounds) has been developed for certain unique military requirements. It also uses simple fixed bean guidance technology. PTAG has the disadvantage that its signal format is not directly compatible with the internationally accepted MLS signal format.

What is required, then, is a method and apparatus whereby the simple fixed beam version of MLS (FBMLS), can be combined with the currently being procured military lightweight PTAG landing system in a cost-effective manner that will satisfy all conventional and unique, current and future, civil and military landing guidance needs. In addition, the merger should evolve towards the ultimate use of one common avionics equipment that is MLS compatible.

THE INVENTION

The first step in the inventive process consists of recognizing the following. The simple Fixed Beam Microwave Landing System described in U.S. Pat. No. 4,635,064 can be implemented at a frequency higher than C-band such as the PTAG X-band frequency. The resulting ground station will satisfy the unique military requirement for a 35 pound ground unit (due to its use of a much higher frequency than the currently employed MLS C-band frequency and the use of fixed beam rather than scanning beam technology).

The second step in the inventive process is to recognize that the radiating patterns of the guidance beams utilized by both FBMLS and PTAG are, in effect, identical since both systems use paired overlapping fixed beams to provide the required coarse and precision guidance.

Third is to recognize that both FBMLS and PTAG employ time division multiplexing signal formats, the former occupying a large percentage of the time available, and the latter a very small percentage of the time available.

The invention consists of combining the above-mentioned three relationships, as between FBMLS and PTAG, into one ground station to radiate interleaved X-band FBMLS and PTAG signals from the same antennas and using the same RF and associated electronics in a non-interfering manner. In this way, aircraft with PTAG avionics and other aircraft with MLS avionics, can both receive a suitable landing guidance signal from this FBMLS and PTAG integrated and signal interleaved ground station. In effect, only one simple ground station can provide landing guidance to aircraft with either MLS or PTAG avionics, for unique military missions requiring a lightweight ground station.

ADVANTAGES OF THE INVENTION

The basic advantage of the present invention is to permit the PTAG ground stations to simultaneously radiate a FBMLS signal format as well as the PTAG signal format. This dual capability makes these ground stations twice as effective, in that both those aircraft equipped with currently-available PTAG avionics, as well as those aircraft to be equipped with future MLS avionics, can receive and generate a landing guidance signal when they are on unique military missions requiring very lightweight ground stations.

An additional advantage of the present invention is that, as time progresses, and all military aircraft are equipped with MLS avionics, the need for special PTAG avionics will decrease, thus resulting in a cost-effective transition to MLS compatible avionics equipment in all military aircraft.

On the ground, the family of MLS compatible ground stations will consist of C-band SBMLS equipment for those limited number of airports requiring curved approaches, C-band FBMLS at all other civil and fixed base military airports, and X-band FBMLS for unique military requirements where ground station weight is critical.

BRIEF DESCRIPTION OF THE DRAWING

These and other objects and advantages of the present invention will become readily apparent upon consideration of the following detailed description and attached drawings wherein.

DETAILED DESCRIPTION OF THE PREFERRED EMBODIMENT

The preferred embodiment of the present invention is preceded by a description of one current embodiment of the PTAG landing system described in U.S. Pat. No. 4,429,312. Following that description, an embodiment is provided of the FBMLS as described in U.S. Pat. No. 4,635,064. It is then shown how the invention described herein utilizing the basic PTAG ground equipment can be used to configure a landing system ground station that radiates in an interleaved and non-interfering manner both PTAG and FBMLS signals.

FIG. 1 illustrates the azimuth portion of one embodiment of the landing system covered by U.S. Pat. No. 4,429,312. This embodiment is for a split site system (i.e., one in which there is a separate localizer installation on center-line, not shown, near touchdown, at the approach end of the runway, similar to the split site siting of well known prior art ILS installations). That system is currently marketed by Sundstrand Data Control, Inc. under the trademark "PTAG".

A ground based radio frequency transmitter 1 generates pulse sequences. Each sequence comprises multiple pulses having predetermined coded time spacings. The sequences occur at spaced time intervals, which intervals are large, compared to the duration of the pulse sequence. The pulses are encoded with data such as station identity, etc., by the data encoder 1b under control of logic unit 1a. The station identification digital encoding, different for each station, is controlled by the input, line 8, to the logic control unit 1a. The transmitter is sequentially connected under control of logic unit 1a, via a line 2 and switch 3 to paired antennas 4 and 7, and 5 and 6 that radiate two sets of paired, overlapping beams with beam patterns 11 and 12, and 9 and 10 of FIG. 1B, with each set, respectively, defining the same azimuth guidance path 13 by virtue of equal left/right signal intensity for such paired overlapping beams.

In the aircraft, the signal is received via an antenna 15 and receiver 16. The output of the receiver 16 is employed by processor 17 to generate guidance data by virtue of a comparison of the relative signal intensities received in the aircraft from sets of paired overlapping fixed beams. The generated guidance data is used to drive a conventional cross pointer type of guidance display 18. For the azimuth only embodiment shown in FIG. 1A, only the localizer needle 19 would be displaced in accordance with the processor derived guidance data. The glideslope needle 20 would be activated in response to a glideslope ground installation (not shown for purposes of simplicity).

Figures 1A, 1B, 1C:
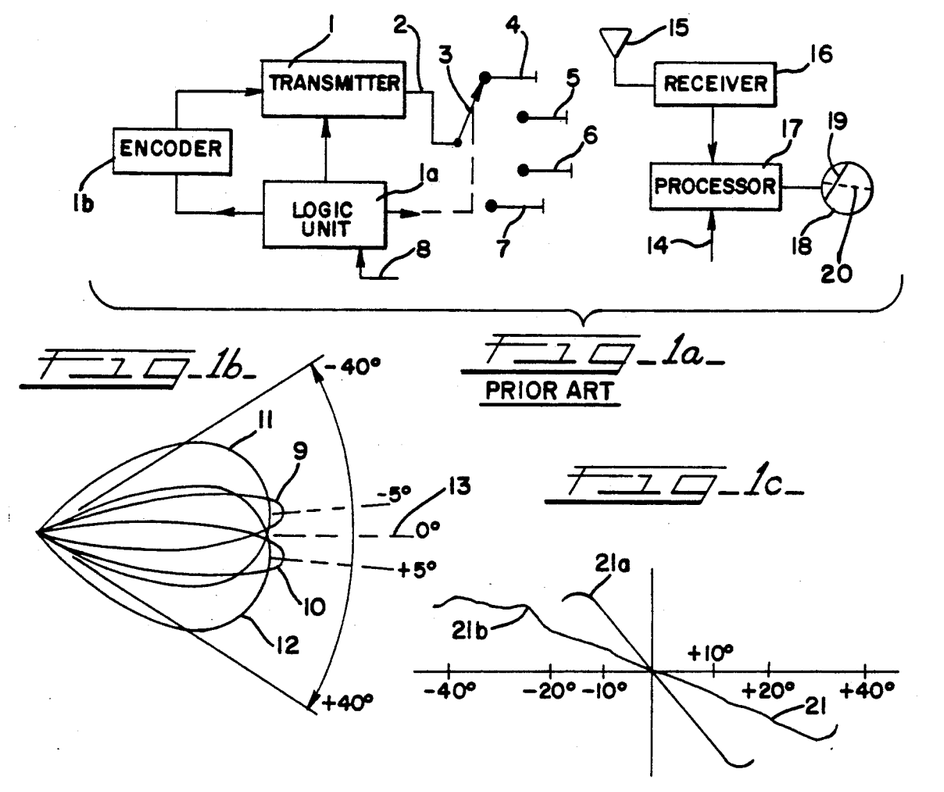
FIGS. 1A, 1B, 1C and 1D are graphical illustrations of a guided system as described in U.S. Pat. No. 4,429,312.

It can be noted that these two sets of paired beams, each of which pairs overlap on centerline, have different beam widths, one pair having wide beam patterns 11 and 12, and one set employing narrow beam patters 9 and 10.

Figure 1D:
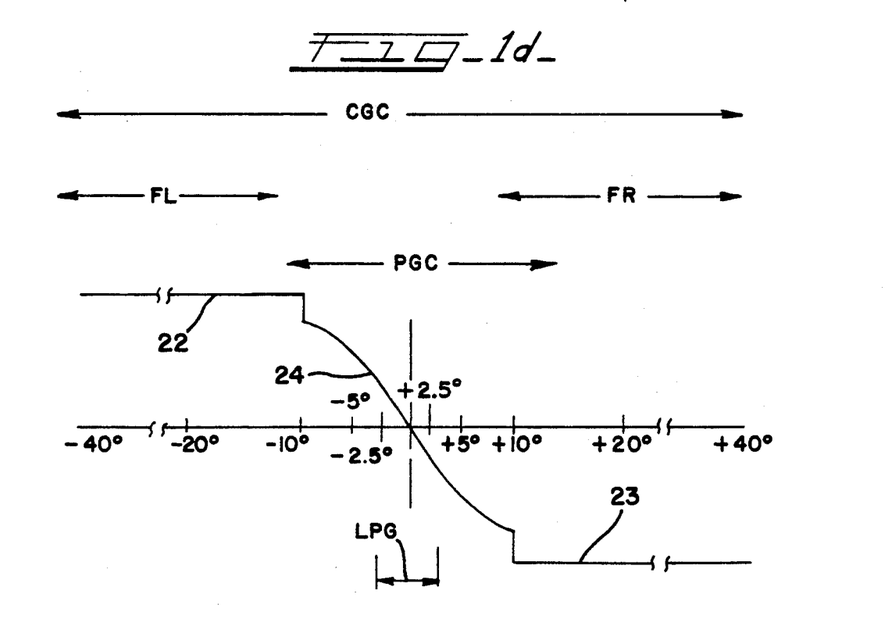

Each set of paired, overlapping beams provides the same basic guidance function. The wider beams provide the wider coverage coarse guidance function 21 of FIG. 1C, and the narrower beams provide the more restricted, in angle, precision guidance coverage 21a. The wider angular function (since it is generated by wider angular beams that could encompass lateral reflecting objects such as hangars adjacent to the landing runway) is susceptible to coarse errors generated by such multipath signals and, therefore, has a tendency to have guidance function perturbations (such as depicted at 21b in FIG. 1C). For this reason, the two wide beams 11 and 12 are generally used to provide only course guidance control (CGC), such as fly/left, fly/right guidance, providing the pilot with a means for intercepting the coverage region of the narrower beam patterns 9 and 10, which narrower beams provide precision proportional guidance (PGC) without perturbations, useful for the final straight-in azimuth approach to touchdown. FIG. 1D outlines the resulting combined guidance function generated in this manner. The resulting guidance function provides fly/left, fly/right information until the narrower beams are intercepted, at which time linear proportional angular guidance (LPG) becomes available, also depicted in FIG. 1D.

This use of two sets of coarse and precision paired beams are also utilized in ILS where the coarse beams are termed "capture beams". The use of such ILS capture beams is one of the improvements made in ILS since the 1960's. This improvement is partially the reason that MLS is not finding acceptance, as noted previously, due to the complexity of its scanning beam technology, in contrast to fixed beam technology, and the satisfactory performance of fixed beams, as presently implemented in ILS, for example. Similarly, in some MLS installations (i.e., ones having restricted scanning beam coverage), similar coarse fixed beams are used to permit capture of the region covered by the precision guidance scanning beam. In MLS, these fixed coarse guidance beams are termed "clearance beams". These wide angle beams are termed "sector beams" in PTAG.

In the aircraft, these sequentially received PTAG beamed signals contain identifying codes that identify the specific fixed beamed signals and, hence, permit the processor to appropriately identify and thus properly utilize their measured intensities to provide the guidance function (FIG. 1D), which would be customarily displayed on the vertically oriented needle 20 of the cross pointer display 18 of FIG. 1A. In FIGS. 1A and 1D, the needle 19 would be "pegged" at left or right position for fly/left 22 or fly/right 23 data, and would deviate linearly between such pegged positions to display precision proportional guidance (PGC) 24 over the specified region, typically ±2.5° or ±5.0°.

Figure 2:
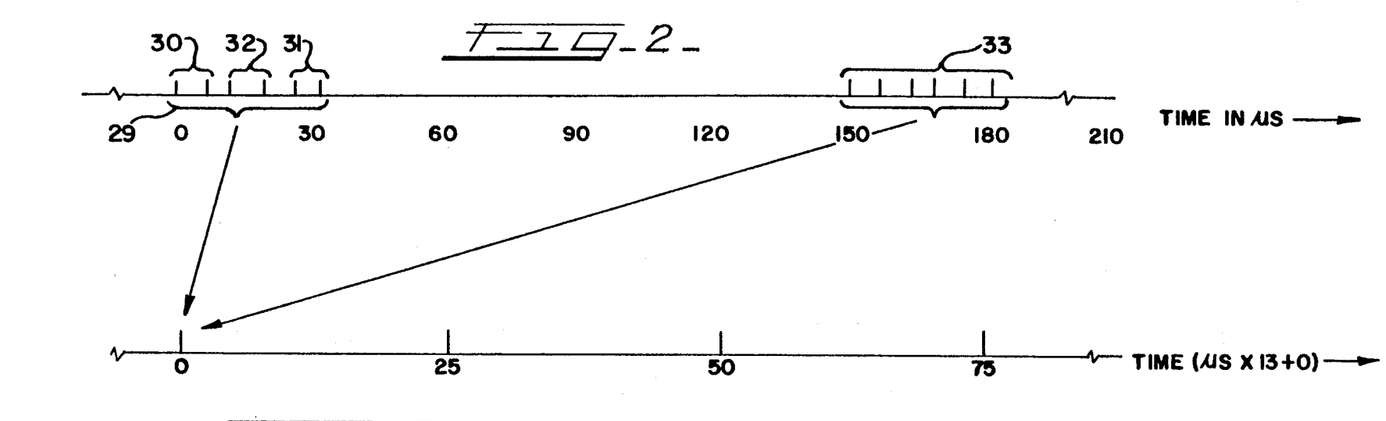
FIG. 2 is a timing diagram for the guidance system operation described in FIG. 1.

The format and timing of the PTAG radiated signal could be as shown in FIG. 2. FIG. 2 depicts a group of pulses 29 being radiated from the azimuth ground station of FIG. 1. This group consists of six pulses spaced normally by six microseconds. Two of the six pulses 30 are radiated from the sector antenna with broad pattern coverage (11) and two more 31 from the other sector antenna with broad pattern coverage (12). The relative intensity of these pulses is determined by the position of the aircraft in the various guidance beams and as measured in the aircraft providing fly/left, fly/right coarse guidance. The signal spacing provides data as to whether these are radiated by the right or left sector antenna, station identification, etc., and are encoded by the data encoder 1(b), under control of logic unit 1(a) of FIG. 1. The digital identity of the ground station, from which it is desired to obtain landing guidance, is controlled by the input line 14 to processor 17.

The additional two pulses 32 are sequentially radiated from the antenna with narrow pattern coverage, one pulse from the antenna with beam pattern 9 and the other from antenna with beam pattern 10. A measure of the relative intensity of such pulses provides the precision proportional guidance.

The radiation of pulse groups are repeated 40 times a second, a number that is adequate to insure stability of the landing guidance loop. Also radiated at the same rate are a group of elevation guidance pulses 33 shown separated by a nominal 150 us from the azimuth guidance pulses, as might occur, for example at a co-located system, i.e., both azimuth and elevation ground equipments located near touchdown.

As can be seen from FIG. 2, the amount of time required for radiation of these PTAG guidance signals occupy but a small fraction of the total time available.

Let us now consider an embodiment of the system described in my U.S. Pat. No. 4,635,064. First, consider conventional MLS, i.e., Scanning Beam (SBMLS).

The typical MLS system is a sequentially operated system which radiates both guidance functions and data functions at different exclusively-occupied time intervals in a repeating sequence. The number of functions that can be radiated are shown in Table 1.

TABLE I

| MLS FUNCTION | |
|---|---|
| Basic Data Word 1 | Approach Azimuth Guidance |
| Basic Data Word 2 | High Rate Azimuth Guidance |
| Basic Data Word 3 | Approach Elevation Guidance |
| Basic Data Word 4 | Flare Elevation Guidance |
| Basic Data Word 5 | Back Azimuth Guidance |
| Basic Data Word 6 | Future-System Growth Guidance |
| Basic Data Word 7 | |
| Basic Data Word 8 | |
| Auxiliary Data | |

The number of guidance functions that are radiated by any particular MLS installation depends on the guidance services which must be provided at that ground location. There is also certain basic data that must be radiated from that installation. The above listed Auxiliary Data and Future-System Growth Guidance functions and their associated time intervals are reserved to accommodate future needs not yet specified.

Each of the above listed data or guidance functions has its own identification code within the preamble associated with that function, which code uniquely identifies the nature of the associated function to the airborne equipment. Since the individual functions are thus identified by their codes, it is not necessary that these functions be performed in any particular sequence. The aircraft receiver and processor include capability for recognizing the function being radiated to it using the preamble which proceeds it, whereby the aircraft receiver is enabled to utilize the information appropriately.

Figure 3:
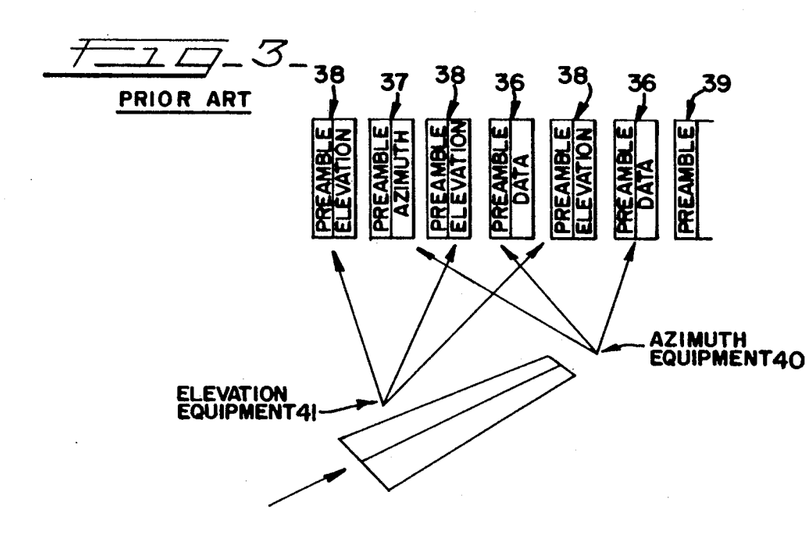
FIG. 3 illustrates a function and radiating sequence for a typical MLS system.
Figure 4:
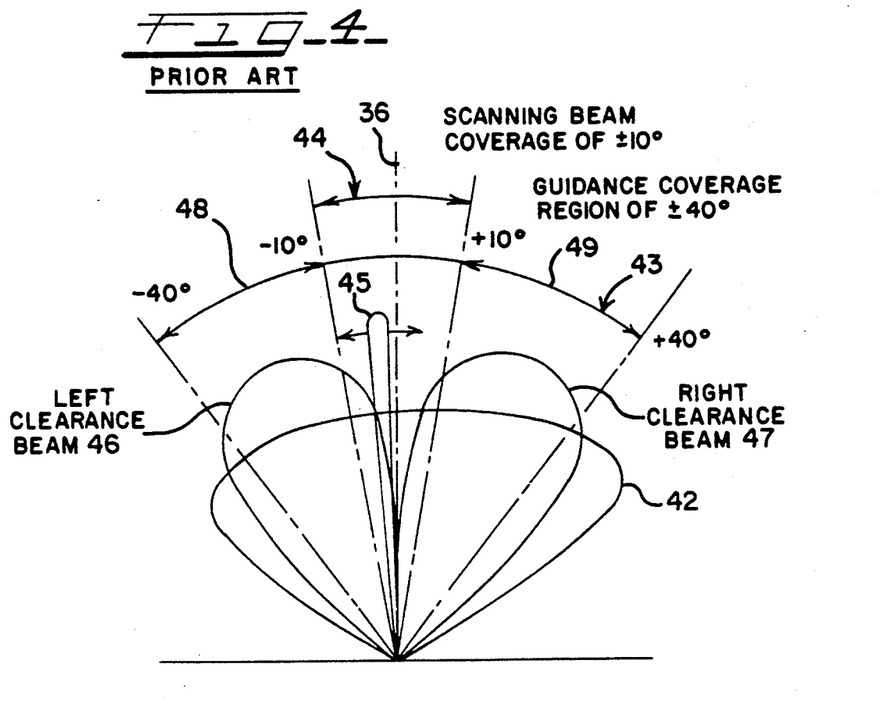
FIG. 4 is a graphical illustration for the operation of a typical MLS system.

Referring now to the drawings, FIG. 3 shows a function radiating sequence both for data and azimuth elevation guidance for a simplified MLS system. Appropriate basic data words are radiated as represented by data functions block labeled 36 at times available between the times of radiation represented by other function blocks such as block 37 for azimuth and block 38 for elevation guidance functions, respectively, these functions all being radiated at repetition rates specified by the MLS ground equipment. A suitable preamble such as the preamble 39 is shown in each function block at the start of the function being radiated and the preambles for the various functions are radiated by the antennas at the guidance installations 40 and 41, the elevation installation 41 being located near the approach end of the runway and the azimuth installation 40 being located along the centerline at the far end of the runway. Specifically, the preamble for the azimuth guidance function 37 is radiated from an antenna with pattern 42 at the azimuth installation that provides coverage throughout the guidance coverage region 43 of ±40° in azimuth (FIG. 4). The basic words are generally radiated together with their preambles using this same antenna within the above-noted angular coverage. If the preamble associated with a particular function indicates that it is an azimuth scanning beam guidance function, then the To and Fro precision guidance signal associated with the preamble will be radiated by a narrow beam antenna with pattern 45, which scans the precision guidance region of ±10°, for the FIG. 4 configuration. The actual precision guidance data are obtained within the aircraft receiver by measuring times between successive passages of the scanning beam pattern 45 past the aircraft, as well known in the MLS art.

Now the MLS scanning beam can cover the noted ±10° region 44 of FIG. 4 or a wider region, which provided coverage is indicated in a radiated basic data word. When the scanning beam coverage is limited, as shown in FIG. 4, fly/left and fly/right guidance is provided by clearance beams 46 and 47 over the regions 48 and 49. These fly/left, fly/right signals provide coarse guidance to permit the pilot to intercept the ±10° region where the precision linear proportional scanning beam MLS guidance becomes available. The resulting guidance function is thus similar to that of FIG. 1D except that the PTAG linear proportional guidance in FIG. 1D is provided by fixed overlapping beams 9 and 12 of FIG. 1B rather than by a scanning beam 45 as in MLS.

Figure 5:
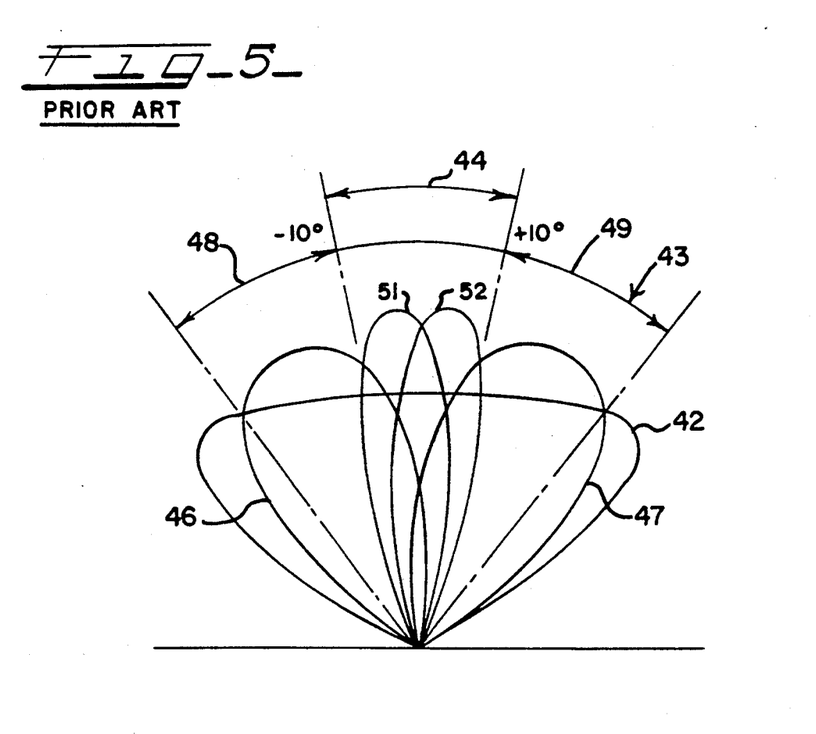
FIG. 5 is a graphical illustration for the operation of a fixed beam MLS system as described in U.S. Pat. No. 4,635,064.

Now, in one embodiment of a fixed beam MLS (FBMLS) configuration, the scanning beam antenna with a pattern 45 of FIG. 4 is replaced by paired fixed precision guidance antennae with beam patterns 51 and 52 as in FIG. 5 and linear precision proportional guidance is provided by the associated airborne processor measuring the relative intensity of such received fixed precision guidance beam signals and providing an output to again generate an overall guidance function as in FIG. 1D. In this manner, the FBMLS ground station is greatly simplified, in that the complex scanning beam antenna mechanism is replaced by simple paired fixed beam antennas. The resulting guidance function is well suited for use at the majority, if not all, airports, as presently demonstrated by existing ILS installations and similar successful use of the PTAG system, both of which generate a similar precision fixed beam guidance function. In effect, the antenna patterns 9 and 10, and 11 and 12 of FIG. 1B are identical to the antenna patterns 51 and 52, and 46 and 47 of FIG. 5.

The above discussion indicates that the PTAG antenna configuration of FIG. 1B is thus suitable for the radiation of FBMLS guidance in that antennas for generating appropriate overlapping paired beams for both FBMLS fly/left and fly/right and FBMLS precision guidance exist.

As a next step let us consider the MLS signal format for purposes of later discussing the interleaved radiation of the FBMLS and PTAG signal formats, by one PTAG ground station transmitter and its associated sets of paired fixed beam antennas, with patterns as depicted in FIG. 1B or FIG. 5.

Figure 6:
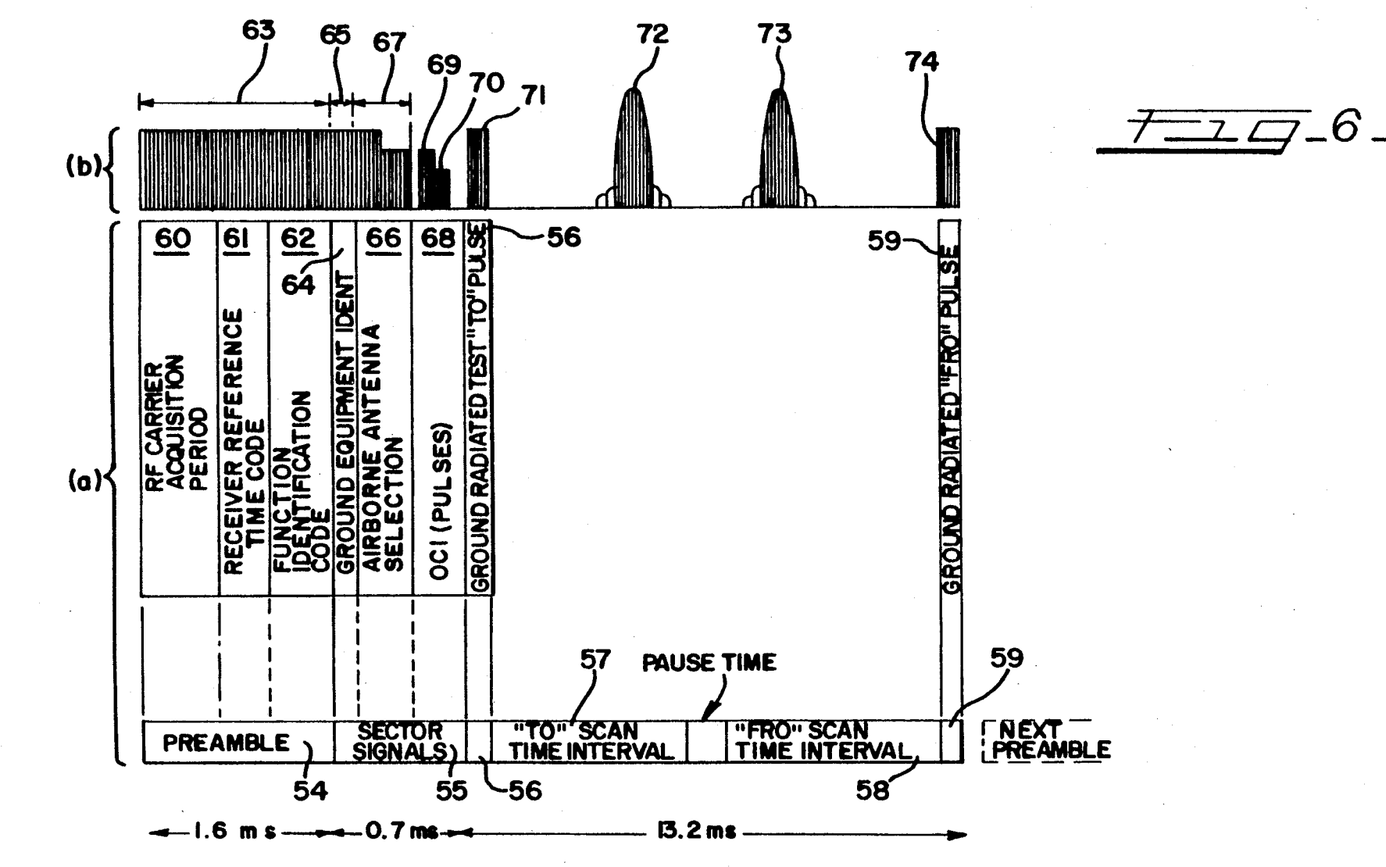
FIG. 6 illustrates the signal format of a typical MLS system.

FIG. 6, in the vicinity of the bracket (a), shows in more detail the timing organization of the radiation during an azimuth scanning function of the MLS ground system including times for preamble 54, sector signals 55, Test To Pulse 56, and TO and FRO scanning intervals 57 and 58 and followed by Test Fro Pulse 59. The preamble 54 is radiated first and includes a continuous wave 60 used for acquisition by the airborne receiver of the radio frequency carrier. This carrier is followed by a receiver reference time synchronizations code 61. This is followed by a function identification code 62, in this case identifying the function as azimuth approach scanning guidance. These radiations constitute the preamble 54 of duration shown by the arrow 63.

The next radiated signals are the sector signals 55 which begin by transmitting a ground station identification code 64 which lasts for the period identified by the arrow 65. Following the identification code, there is radiated a constant level test signal 66 with duration as shown by arrow 67. The signal is used in the airborne equipment by switching airborne antennas during this interval 67 to determine which airborne antenna provides maximum signal and, hence, should be utilized thereafter. Subsequently, OCI signals 68 are radiated which are processed in the receiver to determine whether the aircraft is on a false coarse, i.e., following a scanning beam side lobe as indicated by a received OCI signal being stronger than the false scanning beam signal. Next, a TO scan test pulse 56 is radiated followed by a TO scanning beam, and then a FRO scanning beam followed by a FRO scan test pulse 59 is radiated, these test pulses being radiated immediately proceeding and following the times allocated to the TO and FRO scanning beam times 57 and 58.

As can be seen across the top of FIG. 6, in the vicinity of the bracket (b), the receiver in the aircraft develops appropriate signals based on the ground-radiations as just discussed. Specifically, as shown in FIG. 6 for the azimuth scanning function, the preamble transmissions produce in the receiver a preamble sequence 63, followed by the ground station identification code 65, and followed by the airborne antenna selection radiation 67. There are shown two OCI radiations 69 and 70 (out of six OCI radiations that could be transmitted), followed by the ground radiated TO scan test pulse 71. The TO and FRO scanning guidance beams 72 and 73, respectively, are then received in the aircraft at times depending on the location of the aircraft with respect to the centerline of the runway, and finally the FRO scan test pulse 74 is received.

The clearance pulses corresponding to the signal intensity of the clearance beams 46 and 47 would occur at the limits of the scan interval of the precision scanning beam as established in the aircraft by a radiated basic data word, if the precision scanning beam did not cover ±60°, but some lesser amount, in which case clearance signals would be radiated to provide fly/left, fly/right guidance as previously discussed from FIG. 4. FIG. 6 assumes ±60° scanning beam coverage and, hence, clearance signals are not shown. FIG. 6 also indicates the time allocated for radiating various segments of the azimuth guidance functions.

Now, the FBMLS azimuth guidance function can be radiated in many compatible ways with respect to the MLS signal format as discussed in detail in U.S. Pat. No. 4,635,064. One particular embodiment will be discussed below. In this embodiment, the FBMLS guidance data will be radiated in an auxiliary, as yet unspecified, guidance function reserved for future MLS expansion. It will be radiated with the associated required preamble and certain sector signals, such as, for example, station identification and antenna selection.

Figure 7:
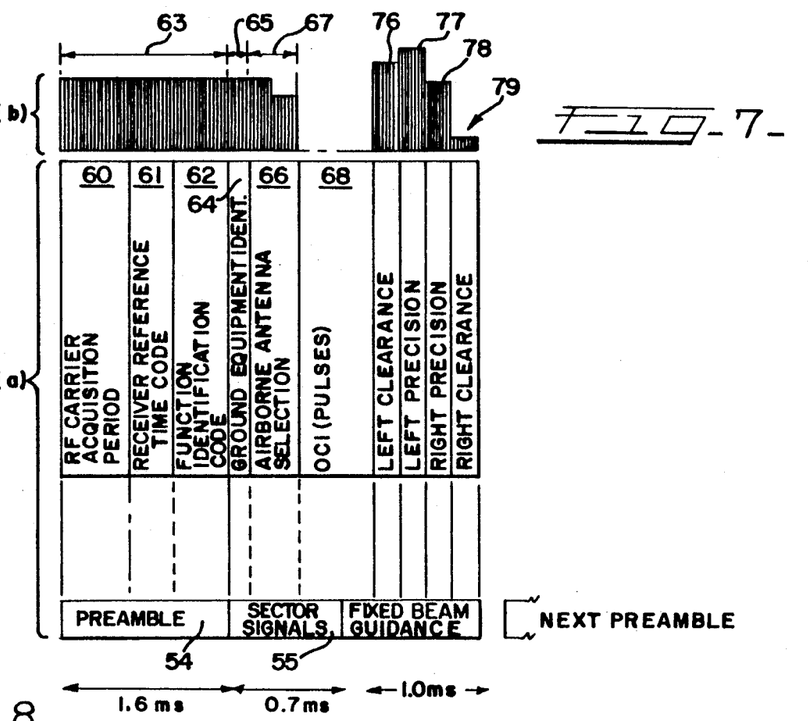
FIG. 7 illustrates the signal format for one embodiment of the fixed beam MLS as described in U.S. Pat. No. 4,635,064.

Additional sector signals such as OCI pulses are not required for the applications of interest, and so will not be shown radiated, although time is made available for their radiation. The TO test is not required since it is only applicable to a scanning beam function and so is not shown. The FBMLS signal format for fixed beam azimuth guidance would then be as shown in FIG. 7. There would first be radiated the preamble 54 followed by sector signals comprising ground equipment identification 64, and then airborne antenna selection 66, then the right clearance beam 76, then right fixed beam precision guidance 77, followed by the left precision guidance beam 78, followed by the right clearance beam 79. The noted relative level of the signals correspond approximately to the antenna patterns 46, 51, 52, 47 and 42 of FIG. 5, and for an aircraft at approximately −8°.

Of significance is the overall duration of this FBMLS signal. The preamble occupies 1.6 ms. The time allocated for all desired sector signals is 0.7 ms and the time utilized for the radiation of each fixed beam guidance function can be four clock pulses in duration, or 0.25 ms for a total of 1.0 ms for the two clearance and two precision fixed beam precision guidance signals. A total time of about 3.3 ms is thus required. For the sake of convenience, let us allocate 3.5 ms for this FBMLS azimuth guidance function, which time is in accordance with the length of Basic Data Words, i.e., we will allocate equal time for all functions, including elevation. It can be noted that the time allocated for this FBMLS guidance radiation is much less than the nominal 15 ms required for the azimuth scanning beam guidance radiation of FIG. 6 due to the lengthy time allocated for the scanning beam to transition the complete precision guidance region when ±60° precision guidance is provided.

Let us now consider the interleaving of PTAG and FBMLS signals is a non-interfering manner.

The key aspects of such interleaving are the times required for each separate PTAG and FBMLS function to radiate and the necessity to radiate them individually at an adequate rate to insure, for example, guidance loop stability when the guidance function is being radiated and also at an adequate data rate for data functions.

Now, from FIG. 2, the time required for an azimuth and elevation PTAG guidance radiation is 150 microseconds. From FIG. 7, the time required for a FBMLS function radiation is 3.5 ms. Table II provides data on the rate at which MLS guidance functions must be radiated for guidance loop stability purposes. A similar rate is adequate for PTAG, as discussed previously.

TABLE II

The Average Transmission Rates and/or Time Between Transmissions for the MLS Functions

| Guidance Functions | Average Function Rate (Hz) |
| --- | --- |
| Approach azimuth guidance | 13 ± 0.5 |
| High-rate approach azimuth guidance | 39 ± 1.5 |
| Back azimuth guidance | 6.5 ± 0.25 |
| Approach elevation guidance | 39 ± 1.5 |
| Flare elevation guidance | 39 ± 1.5 |

| Basic Data Word Functions. Word Number | Maximum Time Between Transmissions (sec.) |
| --- | --- |
| 1 | 0.4 |
| 2 | 0.16 |
| 3 | 10 |
| 4 | 10 |
| 5 | 10 |
| 6 | 10 |
| 7 | 1 |
| 8 | 10 |

Now, various MLS radiating sequences are possible, depending on the service required for a particular airport. Table III(a) indicates such an SBMLS radiating sequence for an airport requiring multiple services, i.e., all angle guidance functions. Table III(b) indicates a sequence for a landing area requiring less services and employing FBMLS as would be for the case for applications of interest. It should be noted that the MLS signal is radiated in sequences that are structured differently within such sequences, in order to minimize the possibility of certain types of synchronous interference. This subject is not significant to the time available for this interleaving operation and, hence, will not be considered herein.

TABLE III

| (a) SBMLS Sequence For Airports Requiring Multiple Services | | (b) FBMLS Sequence for Applications of Interest | |
| --- | --- | --- | --- |
| Sequence | Time (ms) | Sequence | Time (ms) |
| Approach Elev. | 0 | Approach Elev. | 0 |
| Flare | 10 | Approach Azimuth | 3.5 |
| Approach Azimuth | 20 | Data | 10.5 |
| Flare | 30 | Approach Elev. | 14.0 |
| Approach Elev. | 40 | Data | 17.5 |
| Data | | Approach Elev. | 21.0 |
| Back Azimuth | 50 | | |
| Data | | | |
| Approach Elev. | 60 | | |
| Flare | 66 | | |

It should be then noted that the noted FBMLS sequences require approximately one-third the time conventional SBMLS sequences for larger airports requiring multiple services.

It can be further noted that the PTAG ground station antenna system does not use a separate wide angle coverage antenna such as 42 of FIG. 4 to radiate the preamble and sector signals as in MLS, but rather radiates the equivalent PTAG information on each of those PTAG sector antennas 4 and 7 that have patterns similar to that of the clearance antennas, i.e., 11 and 12 of FIG. 1B in order to get wide angle coverage for these signals. In effect, each time a PTAG azimuth guidance function is radiated, the signals separately radiated on the left and right coarse guidance antennas contain duplicate information such as identification, etc. This provides the desired wide angle coverage for such data. This same technique is possible in FBMLS in that a preamble and associated sector signals can be separately radiated on each clearance (PTAG Sector) antenna radiation. In this manner, even though an aircraft flying to an FBMLS ground station using PTAG antennas is off to one side, as could occur on initial approach, and as a result of being off to one side might not receive a preamble and sector signal from one of the clearance (sector) antennas, the aircraft would receive the preamble from the other antenna and, hence would be able to generate appropriate fly/left or fly/right data (as in PTAG).

This technique, however, requires radiating more azimuth guidance signals in order to insure guidance loop stability, i.e, 26 versus the 13 noted in Table II. The preamble and sector signals would be radiated by a left clearance antenna on one transmission, and on the right clearance antenna on a next transmission. This would insure that no matter where the aircraft is in the guidance region, it will always receive a usable azimuth guidance signal, i.e., one containing the preamble and sector signals as well as the guidance signals.

This problem does not occur in the case of elevation, since PTAG uses only one wide angle antenna in elevation (as well as the two up/down narrow precision guidance beams). A similar problem does occur, however, in the radiation of Basic Data Words. A similar solution is possible, i.e., radiate Data Words at twice the Table II rate, with half of them radiated on the left clearance and half on the right.

It should be noted, however, that the PTAG ground station could be modified to include a wide angle coverage antenna, with a pattern similar to 42 of FIG. 5 as in MLS practice. Use of this added antenna would require adding an additional pole to switch 3 of FIG. 1A together with some minor logic changes. The addition of this antenna would eliminate the need to radiate the FBMLS Data Functions, Preamble and Sector signals associated with the azimuth guidance function at a higher rate than discussed in Table II, but this additional antenna would add hardware and complexity to the PTAG ground station.

Figure 8:
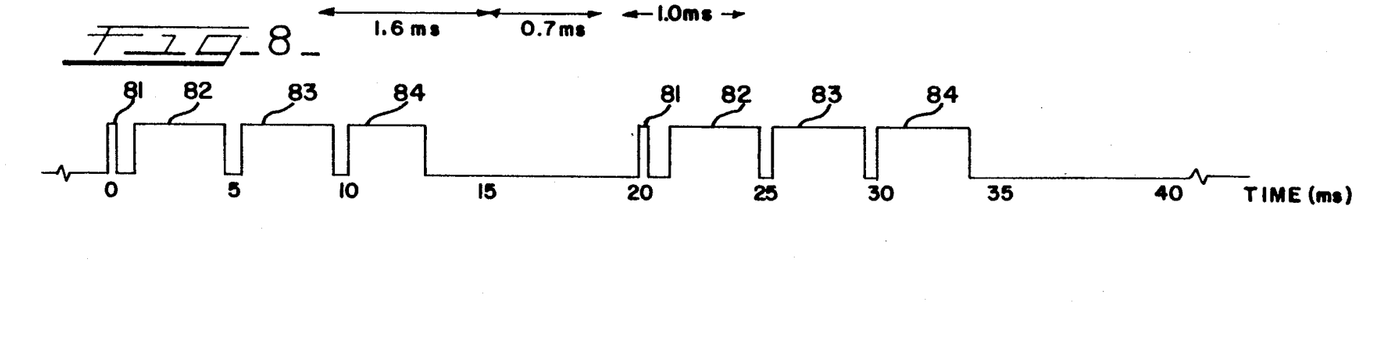
FIG. 8 illustrates the interleaving of PTAG and FBMLS signals according to an embodiment of the present invention.

One possible PTAG/FBMLS interleaved sequence is outlined in FIG. 8.

The objective of the interleaved sequence of FIG. 8, or any other suitable sequence, is to radiate the required signals at or in excess of their specified rates which are 40 updates per second for PTAG, 39 per second for FBMLS glideslope functions at 26 per second for the FBMLS azimuth guidance functions (in order to insure the specified 13 per second rate of Table II) and data words at least twice the rate of Table II, again because of the necessity to sequentially and separately radiate such words on the left and right clearance antenna in order to get the required angular coverage.

The FIG. 8 format more than satisfies the above requirements by employing a sequence rate of 50 per second. Each sequence contains a composite PTAG localizer and glideslope function 81, a FBMLS azimuth guidance function 82, a FBMLS elevation guidance function 83, and data words 84 as needed to satisfy Table II.

Each of the FBMLS functions last 3.5 ms and the PTAG composite azimuth and elevation function lasts a nominal 0.2 ms.

A guard time of 0.5 ms between the FBMLS functions and a nominal guard time of 0.85 ms between the PTAG function and the FBMLS function is allocated. The net result is that about 12 ms out of the 20 ms total sequence time associated with the 50 Hz rate is utilized. This corresponds to 60% of total time available being used up. This percentage of time could, however, be significantly reduced on the average since the FBMLS guidance functions need not be radiated at the 50/sec. rate, and the data words can be radiated at a much lower rate and still meet the requirements of Table II.

The above discussion focused on the fact that the PTAG antenna system, as presently implemented, can be utilized for Fixed Beam MLS in that both PTAG and FBMLS utilize identical fly/left, fly/right wide fixed beam antenna patterns to provide guidance for interception of the narrow fixed beam precision guidance beams also used by both PTAG and FBMLS. In addition, attention was also focused on the interleaving of the two signal formats.

Of associated interest, from the viewpoint of FBMLS and PTAG system, is in the additional ground equipment required that permits the present PTAG ground station required on the ground to permit the PTAG ground station equipment to radiate both signals. This is discussed below. A later discussion will consider airborne equipment.

Now the PTAG ground station transmitter is an X-band crystal controlled 25 watt (W) solid state unit. This transmitter, in anticipation of this potential application, was designed to be capable of operating continuous wave (CW) at this rated power, i.e., it can also radiate the long pulses required for FBMLS operation, in addition to the short pulses required for PTAG.

Of specific interest with respect to the power output of the PTAG transmitter, is the adequacy of that power to provide a suitable signal for FBMLS.

Now since the FBMLS uses long pulses, in contrast to the very short PTAG pulses, the airborne MLS receiver has a much narrower bandwidth than the PTAG receiver and, hence, is more sensitive, i.e., it has less noise power at its input. The PTAG radiated power is, thus, more than adequate for MLS type operation since a higher signal-to-noise ratio will be achieved with an MLS receiver than with a PTAG receiver at ranges of interest and PTAG has proven performance at such ranges of interest.

It must be further noted that PTAG is a multiple channel short pulse fixed frequency system, with channel selection and/or station identify provided by digital coding of the PTAG pulses. MLS, on the other hand, is a multiple channel system with station selection based on changing frequency. The PTAG common ground station transmitter must, therefore, be able to transmit on the PTAG fixed frequency and then, within the short period of time during the signal interleaving process between PTAG and FBMLS operation, be able to change frequency and radiate on the MLS channel assigned to that PTAG/FBMLS ground station for purposes of radiating the FBMLS signal. Modern solid state transmitters of the PTAG type are able to accomplish this frequency hopping in a few microseconds as discussed later with respect to a preferred embodiment. This time required is much less than the guard time of 0.85 ms allocated between the radiation of the PTAG and FBMLS functions in FIG. 8 interleaving time diagram.

It should be noted, however, that nothing precludes the useful radiation of the short pulse PTAG and the long pulse FBMLS signals on the same frequency. This might be desirable where an absolute minimum of hardware modification to the PTAG ground station is desired. In this same frequency mode of PTAG/FBMLS operation the question of interference and/or generation of false guidance data between the same frequency receiver PTAG and FBMLS signals must be considered, as below.

The presence of the FBMLS signals in the PTAG receiver would not be detrimental to PTAG operation in that the PTAG processor is designed specifically to reject on-frequency signals that do not provide the exact digital coding of the PTAG pulses associated with the different guidance function of a selected PTAG ground station. This is because in normal PTAG operation, the azimuth and elevation ground stations are separate and are not time synchronized in their operation and, hence, the PTAG Azimuth and Localizer signals drift through each other, with resulting garbling, i.e., time superimposition of same frequency localizer and glideslope guidance functions.

In addition, on-frequency signals from other PTAG ground stations in the vicinity might be received, further increasing garbling. Because of this on-frequency, same and/or multiple station garbling potential, the PTAG airborne processor is programmed to recognize garbled signals and only process those signals that are isolated in time and have the proper digital identity, i.e., the PTAG processor is designed not to erroneously process PTAG same-frequency signals. The PTAG processor can thus operate in the presence of extremely strong on-frequency interference.

In a similar manner, the FBMLS avionics would reject the very short PTAG signals that occupy less than 0.1% of the time, treating such PTAG signals as noise impulses, in contrast to the much longer FBMLS guidance and data functions and, hence, reject them.

The PTAG ground station must additionally structure the FBMLS signal radiation in accordance with FIG. 7. This requires the addition of digital phase shift keying with an MLS digital zero represented by a zero (0) phase shift between succession pulses occurring every 67 microseconds. A one (1) is represented by 180° of phase shift. The signalling rate is thus 15, 625 bits a second.

It is additionally required that an appropriate auxiliary data word indicating a FBMLS guidance function must be processed in accordance with certain software routines established in the airborne processor, radiated by the ground station, and received and processed in the aircraft.

The net result is that the PTAG ground station is capable of radiating a FBMLS signal with minor additions of phase shift keying and some additional digital control logic.

Another point of significance is that while PTAG needs only a single assigned frequency, nominally 9310 MHz, FBMLS operation requires 60 MHz of bandwidth to accommodate its 200 channels each 0.3 MHz wide. It is, thus, necessary to determine if there is an available frequency allocation at X-band for such integrated PTAG and FBMLS operation.

In fact, a 200 MHz wide frequency allocation is available for Precision Approach Radar (PAR or GCA-Ground Controlled Approach) between 9.0 and 9.2 GHz. This allocation is adjacent to the PTAG operating frequency of 9310 MHz. It can, therefore, be assumed that the integrated and interleaved system can utilize a small portion of this PAR band for PTAG and FBMLS operation since the integrated system provides a landing approach capability compatible with Precision Approach Radar use.

In addition, the airborne C-band MLS receiver must accept the X-band FBMLS signal for such integrated PTAG and FBMLS operation. This requirement is satisfied by adding an X-band-to-C-band converter changing the received X-band FBMLS signal to C-band for input into the C-band MLS receiver.

FIG. 9, therefore, depicts an embodiment of an FBMLS/PTAG system, ground and air. Operation of the integrated and interleaved system is as follows.

Figure 9A:
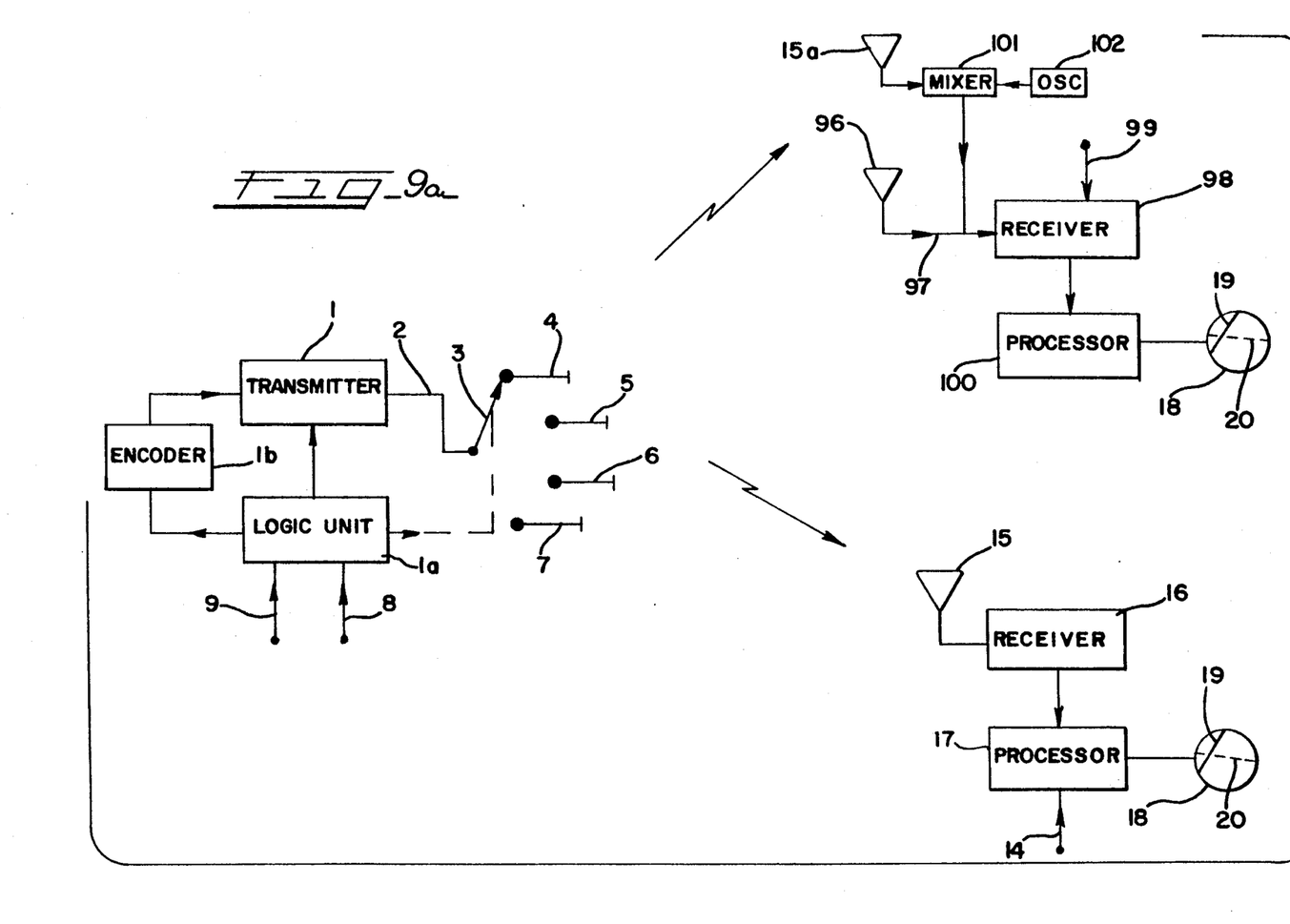
FIGS. 9A, 9B, 9C and 9D are functional block diagrams of the composite system, i.e., interleaved and integrated FBMLS and PTAG.

The FIG. 9A ground station block diagram is similar to that of FIG. IA except for the input control line 9 used for setting the frequency of the FBMLS X-band channel assigned to that particular FBMLS/PTAG ground station. Input line 8, as in FIG. 1A, sets the PTAG digital encoding assigned to that particular FBMLS/PTAG ground station.

Ground station operation, either in the PTAG or FBMLS radiation mode is similar to that described with respect to FIG. 1 with the exception of the interleaving process between PTAG and FBMLS, the MLS DPSK encoding, and the tuning between the separate frequencies utilized for FBMLS and PTAG, all of which are discussed later using FIG. 9B.

The PTAG airborne receiver 16 is a fixed tuned receiver tuned to receive the X-band fixed frequency PTAG guidance signal as input to X-band antenna 15. The channel selecting input line 14 selects the digital code associated with the particular PTAG or PTAG/FBMLS ground station that is desired to receive PTAG guidance from. PTAG avionics and avionics operation is thus identical to that of FIG. 1A.

The standard MLS portion of the MLS avionics consists of a C-band antenna 96 that is connected to receiver 98 via wire 97. The receiver 98 is tuned to the selected C-band ground station for normal C-band FBMLS or SBMLS use, via input wire 99. The output of the receiver is supplied to MLS processor 100 which drives a conventional landing display 18 having up-down and left-right needles 20 and 19, all as in prior art MLS practice.

For operation in the tactical environment, where X-band FBMLS guidance generated by the light weight PTAG/FBMLS station is to be utilized, MLS avionics operation is as follows.

The X-band FBMLS signal is received by antenna 15a similar in function to antenna 15 of the PTAG avionics. The signal from antenna 15a is supplied to mixer 101. Mixer 101 is also supplied by fixed frequency local oscillator 102. The combined operation of the mixer 101 and local oscillator 102, converts the incoming X-band FBMLS signal to a C-band MLS frequency. This resulting C-band MLS frequency is coupled into the MLS receiver input line 97, and hence into MLS receiver 98.

The MLS receiver is tuned, via wire 99, to that C-band MLS channel that corresponds to the difference between the X-band FBMLS frequency set by ground station frequency control input line 9 and the fixed frequency of the local oscillator 102. Once this frequency converted X-band-to-C-band MLS signal enters the receiver 98, operation is as in FBMLS prior art practice.

Let us now consider the changes to the PTAG ground station required for the interleaved radiation of the X-band PTAG and FBMLS guidance signals. Refer to FIG. 9B which shows in more detail the operation of the ground station of FIG. 9A.

Figure 9B:
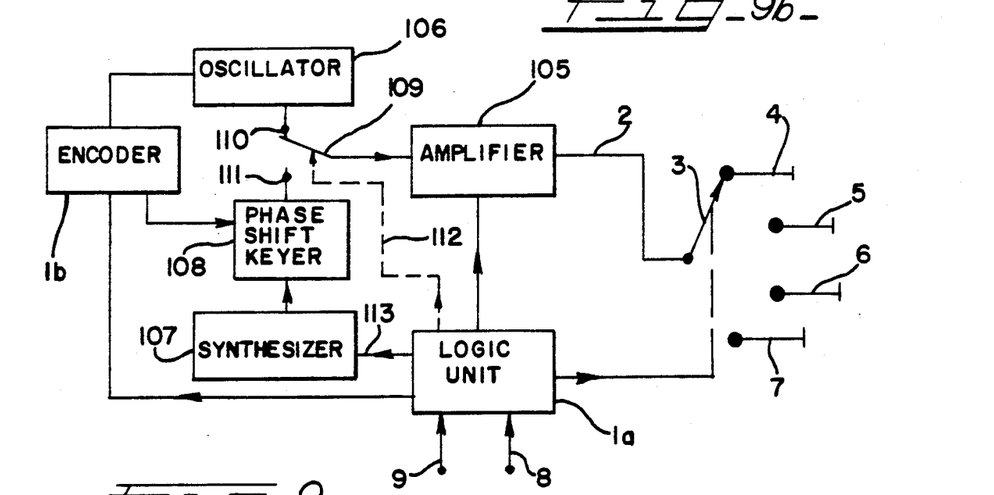

In FIG. 9B there is shown the FIG. 1A azimuth ground station with logic control unit 1a and data encoder unit 1b. Also shown is power amplifier 105 and crystal controlled low level X-band oscillator 106, both parts of transmitter 1 of FIG. 9A or FIG. 1A. Added to FIG. 1A, the conventional PTAG ground station, is X-band frequency synthesizer 107, digital phase shift keyer 108 and solid state RF switch 109, similar to solid state switch 3 of FIG. 1A and FIG. 9B. The switch 109 has input 110 from crystal controlled oscillator 106 and input 111 from added digital phase shift keyer 108. Switch 109 is controlled by line 112 from logic control unit 1a. Interleaved FBMLS/PTAG operation would be as follows.

Assume the guidance signal to be initially radiated is the PTAG portion 81 of the sequence of FIG. 8 with the PTAG azimuth guidance radiation occurring first as in FIG. 2.

Referring to FIG. 9B, the input line 8 is used to select, via logic control unit 1a, the address coding associated with the PTAG radiation for that particular ground station. The logic control unit further causes switch 109, via line 112, to be in position 110. This connects the X-band crystal controlled oscillator 106 to the input of power amplifier 105, as in current PTAG practice. The logic control unit 1a, via data encoder 1b, then causes the oscillator 106 and amplifier 105, commonly referred to as transmitter to radiate a multiple pulse sequence, the sequence containing predetermined and coded pulse spacings, again as in the prior art. The transmitter is sequentially connected via line 2 and switch 3 during this sequence to the paired antennas 4 and 7 and 5 and 6, and so causes the multiple pulses to be radiated by two sets of paired overlapping guidance beams, again as in present PTAG practice.

Once the PTAG azimuth sequence has been radiated, the PTAG elevation sequence of FIG. 2 is radiated, some 150 microseconds later via the elevation ground station, not shown. The FBMLS guidance signal must then be radiated, some 850 microseconds later. This is accomplished as follows.

The X-band frequency associated with the channel assigned to the ground station FBMLS radiation is inputted to logic control unit via line 9 where it is used to set the X-band frequency of frequency synthesizer 107 via control line 113. The output of the frequency synthesizer is connected to the input of the differential phase shift keyer (DPSK) 108, the output of which DPSK unit appears on line 111. As a first step in radiating the FBMLS azimuth guidance function, the logic control unit causes switch 109 to go to line 111, causing the X-band output of the DPSK unit to drive power amplifier 105 and switch 3 to connect the power amplifier 105 to antenna 4. The logic control unit then causes data encoder 1b to cause the DPSK unit 108 to generate a preamble 54 of FIG. 7.

The preamble includes a continuous wave 60 used for acquisition by the airborne receiver of the radio frequency carrier, i.e. it is not phase shifted during its radiation by DPSK unit 108 under control of data encoder 1b. This carrier is followed by a receiver reference time synchronization code 61 followed by a function identification code 62, in this case identifying the function as azimuth fixed beam MLS guidance, both codes being DPSK encoded by DPSK unit 108 under control of data encoding unit 1b and logic control unit 1a. These radiations constitute the preamble 54 of duration shown by the arrow 63.

The next radiated signals are the selector signals 55 which begin by transmitting a ground station identification code 64 which lasts for the period identified by the arrow 65 which code is DPSK encoded by DPSK unit 108 under control of data encoder unit 1b and logic control unit 1a. Next is constant level test signal 66 with duration as shown by arrow 67. The signal is used in the airborne equipment by switching airborne antennas during this interval 67 to determine which airborne antenna provides maximum signal and, hence, should be utilized thereafter, provided such airborne equipment has multiple X-band antennas, which is not the case for the FIG. 9A configuration.

The above preamble and sector signals would be radiated by the left clearance antenna 4 with antenna pattern 11 of FIG. 1B, with such antenna being selected by switch 3, as set by logic control unit 1b.

Following this preamble and sector signal radiation, the logic control unit 1a would cause switch 3 to switch the four paired antennas 4 and 7 and 5 and 6 of FIG. 9B (or FIG. 1A) to radiate the coarse and precision guidance signals 76, 77, 78 and 79 of FIG. 7. Operation would be as follows. Logic control unit would set switch 3 to first connect power amplifier 105, via line 2, to the antenna 4 with pattern 11, then to the antenna 5 with pattern 9, then to the antenna 6 with pattern 10, then to antenna 7 with pattern 12, i.e., to radiate the left clearance or coarse guidance signal 76, then the left precision guidance signal 77, then the right precision guidance signal 78, then the right clearance or coarse guidance signal 79, respectively as shown in FIG. 7. During this radiation of paired fixed beacon guidance, there would be no data encoding, i.e., DPSK encoding.

Following this sequence, the elevation ground station (not shown) would radiate the elevation guidance function 83 of FIG. 8 some 0.5 ms later. Following that, some 0.5 ms later basic data words encoded by data encoder 1b and DPSK unit 108, all under control of logic control unit 1b would be radiated. For this operation, the logic control unit 1a would set switch 3 to connect the power amplifier 105 to the left clearance antenna 4 with pattern 11.

At the start of the next radiating sequence, some 8 ms later, the same operation would be repeated except that the preamble, and sector signals associated with the FBMLS azimuth guidance function and the FBMLS basic data words would all be radiated with the logic control unit 1a connecting the power amplifier 105 to the antenna 7 with pattern 12 of FIG. 1B. This alternative antenna use would insure that an aircraft any place in the guidance coverage region would be sure to receive guidance signals containing a preamble, sector data and basic data words at an adequate rate for both control loop stability, and also to insure meeting the basic data rate requirements of Table II, as previously discussed. In this case, the airborne received data rate for data words and azimuth guidance signals containing all the required sector and preamble information would be at least 25 in view of the 50 per second sequencing rates employed in FIG. 8.

Figure 9C:
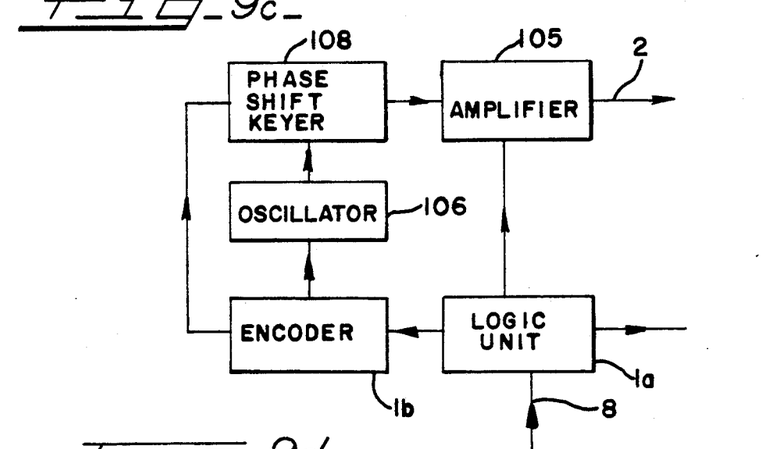

Implementation of a simplified same frequency FBMLS and PTAG ground station would result in the ground station being as shown in FIG. 9C. FIG. 9C is similar to FIG. 9B, except for the elimination of the frequency synthesizer 107, solid state switch 109 and frequency selection input 9. Operation would be as previously discussed, except that the logic control unit a would not have to change frequency via use of the eliminated switch 109 and frequency synthesizer 107.

Figure 9D:
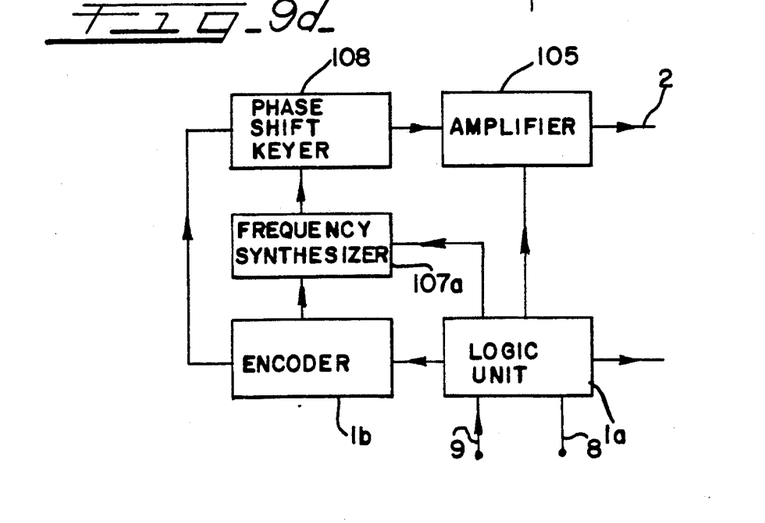

It can be further noted that if a fast tuning frequency synthesizer capable of changing frequency in less than a millisecond (which units are now becoming available) were employed, the ground station block diagram would be as in FIG. 9D. Operation would be similar to that of FIGS. 9B and 9C, except that logic control unit 1a would set the frequency of fast tuning frequency synthesizer 107a to the frequency selected by FBMLS input frequency selection line 9 when FBMLS signals were radiated and to the PTAG frequency when PTAG signals were radiated.

Obviously, many modifications and variations of the present invention are possible in light of the above teachings. Thus, it is to be understood that, within the scope of the appended claims, the invention may be practiced than as specifically described above.

What is claimed and desired to be secured by letters patent of the United States is:

1. An integrated fixed beam landing system suitable for guiding an aircraft equipped with guidance systems that utilize signals encoded in a microwave landing system (MLS) format as well as aircraft equipped with guidance systems that utilize signals encoded in a precision tactical approach guidance (PTAG) format along an approach path to a landing site, comprising
   a plurality of ground based fixed beam antennas disposed near the landing site and oriented so that the fixed beams of the antennas overlap along the approach path;
   means coupled to said fixed beam antennas for generating microwave energy for transmission by said fixed beam antennas;
   first means for generating guidance signals in the microwave landing system (MLS) format;
   second means for generating guidance signals in the precision tactical approach guidance (PTAG) format; and
   sequencing means coupled to said microwave energy generating means and to said first and second guidance signal generating means for causing said microwave energy generating means sequentially to generate microwave energy in the microwave landing system (MLS) format and in the precision tactical approach guidance (PTAG) format.

2. A system as recited in claim 1, wherein the frequency of the microwave energy generated by the microwave energy generating means is the same for both the microwave landing system (MLS) and the precision tactical approach guidance (PTAG) formats.

3. A system as recited in claim 1, wherein the frequency of the microwave energy generated by the microwave energy generating means is different for the microwave landing system (MLS) and the precision tactical approach guidance (PTAG) formats.

4. An integrated fixed beam landing system suitable for guiding an aircraft equipped with guidance systems that utilize signals encoded in a first format as well as aircraft equipped with guidance systems that utilize signals encoded in a second format along an approach path to a landing site, comprising
a plurality of ground based fixed beam antennas disposed near the landing site and oriented so that the fixed beams of the antennas overlap along the approach path;
means coupled to said fixed beam antennas for generating microwave energy for transmission by said fixed beam antennas;
first means for generating guidance signals in the first format;
second means for generating guidance signals in the second format; and
sequencing means coupled to said microwave energy generating means and to said first and second guidance signal generating means for causing said microwave energy generating means sequentially to generate microwave energy in the first format and in the second format.

5. A system as recited in claim 4, wherein the frequency of the microwave energy generated by the microwave energy generating means is the same for both formats.

6. A system as recited in claim 4, wherein the frequency of the microwave energy generated by the microwave energy generating means is different for the two formats.

7. A method for providing an interleaved sequence signal having guidance information of a microwave landing system (MLS) format encoded in both a first format guidance signal of the precision tactical approach guidance (PTAG) format, and a second format guidance signal of the fixed beam microwave landing system (FBMLS) format, permitting the transmitted interleaved sequence to be received by aircraft having either PTAG or MLS receivers, and for use in a landing guidance system, comprising the steps of:
transmitting a composite first format guidance signal at a rate of at least the specified rate for said MLS format wherein said composite first format signal represents information for first format localizer and glideslope functions;
transmitting said second format guidance signal at a rate of at least the specified rate for said MLS format wherein said second format guidance signal represents information for second format azimuth and elevation guidance functions; and
transmitting a first and second format data words at a rate of at least twice the specified rate for said MLS format.

* * * * *